J. M. Case,

Steam Boiler Feeder.

No. 101,225.  Patented Mar. 29, 1870.

Witnesses
J. N. Case
Emma A. Case

John M. Case
Inventor

UNITED STATES PATENT OFFICE.

JOHN M. CASE, OF WORTHINGTON, OHIO.

IMPROVEMENT IN STEAM-BOILER FEEDERS.

Specification forming part of Letters Patent No. 101,225, dated March 29, 1870.

*To all whom it may concern:*

Be it known that I, JOHN M. CASE, of Worthington, county of Franklin, in the State of Ohio, have made a new and useful Improvement in Steam-Boiler Feeders; and I do declare that the following is a full, clear, and exact description thereof, which will enable others skilled in the art to make and use the same, reference being had to the accompanying drawings and letters of reference, making part of this specification.

Figure 1:
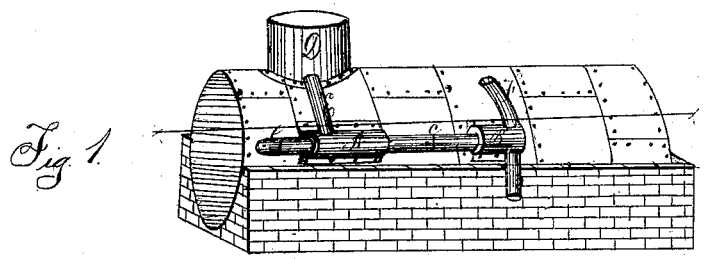
Figure 2:
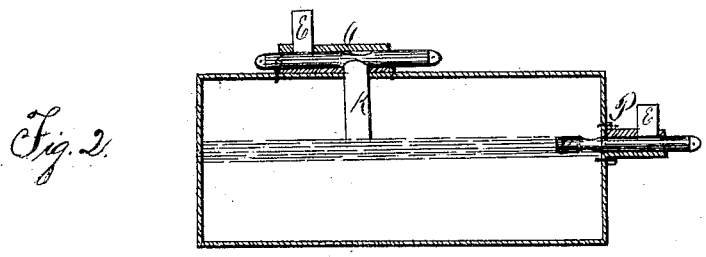
Figure 3:
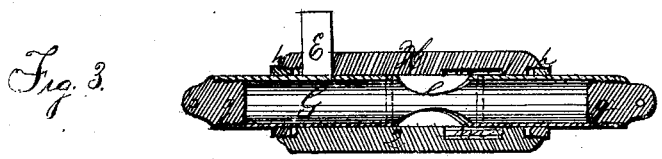

Figure 1 is a perspective view of my steam-boiler feeder attached to a boiler, and having the cold-water pump attached. Fig. 2 is a sectional view of two modifications of my steam-boiler feeder, showing two different modes of attaching it to a boiler. Fig. 3 is a vertical sectional view taken through the line $xx$, Fig. 1.

Similar letters of reference indicate corresponding parts.

My improvement has for its object to produce a simple and easy means of supplying steam-boilers with water, and which shall keep the water always at a given height, thus preventing any danger of explosions from low water.

It also has for its object to overcome the necessity of forcing the water in against the pressure of steam, so that but little power is required to operate it, and which shall supply the place of hot-water pumps, injectors, and low-water indicators in connection with steam-boilers, and shall at the same time be very simple in construction and not liable to get out of order.

A, Fig. 1, represents my steam-boiler feeder firmly bolted to the side of the boiler.

B is the cold-water pump, which may be detached from the feeder, when it is not desired to operate it, by uncoupling the shaft at $c$.

D is a water tank or reservoir, which may be placed at any point desired. This tank has a pipe, E, connected at the bottom, and communicates with the feeder A, by which means the chamber is always kept filled.

F is a pipe, connected with the cold-water pump and tank, for the purpose of keeping the tank supplied.

G is the feed pipe or shaft, and is made to connect with the engine in any manner to give it a reciprocating motion. This pipe or feed-shaft has a hole cut through it on both sides, and is made solid at each end, leaving it hollow in the middle for whatever length necessary to give it capacity to feed enough water, as shown at $g\ g$, Fig. 3.

In Fig. 3, H represents the feed-cylinder. It is made of equal size throughout, and is provided with a discharge-port, $m$, opening out into a hole of equal size leading into the boiler. This port should be made of sufficient capacity to allow the water to pass freely into the boiler. There is also a smaller port or hole above the feed-pipe G, as shown at $n$, for admitting steam while the water is being discharged through the port $m$. The feed-cylinder is provided with packing-boxes $h\ h$, to prevent the escape of steam or water. The feed-pipe G is a hollow tube, stopped up by the plugs $g\ g$, screwed into or otherwise firmly fastened in each end. It is made to fit the cylinder H, and may be provided with metallic packing-rings, as indicated by the dotted lines, Fig. 3. The center of the feed-pipe has two or more large holes cut through it, as shown at $l$, for admitting and discharging water. It is connected with the engine by a pitman or otherwise, so that it shall have a slow reciprocating motion. The pitman may be provided with a slotted hole where it is connected with the crank, so that the feed-pipe will be allowed to stop at the end of each stroke, giving it plenty of time to fill and discharge.

The operation is as follows: The feed-pipe is drawn out until the holes $l$ come under the supply-pipe E, when, by the head of water above, the feed-pipe is filled up to the points $g\ g$. It is then carried back, and on reaching 2 it is entirely cut off. On passing to $m$ it runs by its own gravity out of the feed-pipe and through the discharge-port into the boiler. The feed-pipe fills with steam from the port $n$, which is carried back and passes up the pipe E into the tank, where it is condensed. If, however, the water in the boiler is above the feed-pipe, it will not discharge any water. If it is half-way up on the feed-pipe, it will discharge one-half its contents. The feed-pipe should, therefore, be made with a capacity to feed more than the boiler can consume under any circumstances. The surplus will be carried back; but the water in the boiler can never become too high or too low, making it both a thing of safety and economy. It may not be convenient under all circumstances to attach my feeder to the side of a boiler. I have therefore modified it, as shown by O and P, Fig. 2.

O represents my feeder when attached to the top of a boiler. It is made similar in construction as before described, and is provided with a pipe, K, which passes down into the boiler to the water-line. The feed-pipe $g$ will then discharge water only when the water in the boiler is below the end of the pipe K.

P, Fig. 3, represents the feeder attached to the end of a boiler. This form of construction is best adapted to upright boilers, in which case the feed-pipe G may pass through the boiler, so that there will be no outward pressure of steam in the feed-pipe.

Having thus fully described my steam-boiler feeder, what I claim as my invention, and desire to secure by Letters Patent, is—

The feed-pipe G, stopped up at each end and provided with two or more large holes in the center for receiving and discharging water, when used in connection with the feed-cylinder H, substantially as herein shown and described.

JOHN M. CASE.

Witnesses:
WAYNE SMITH,
ISAAC N. CASE.